(12) United States Patent
Hartmann et al.

(10) Patent No.: US 7,455,505 B2
(45) Date of Patent: Nov. 25, 2008

(54) DEVICE FOR THE DEMOUNTING OF BLADES OF A TURBINE OR OF A COMPRESSOR

(75) Inventors: Martin Hartmann, Bochum (DE); Werner Polanz, Duisburg (DE); Sabine Rintzel, Mülheim an der Ruhr (DE); Peter Schröder, Essen (DE); Vadim Shevchenko, Dortmund (DE); Thomas-Dieter Tenrahm, Dinslaken (DE); Bernd Vonnemann, Gladbeck (DE)

(73) Assignee: Siemens Aktiengesellschaft, Munich (DE)

( * ) Notice: Subject to any disclaimer, the term of this patent is extended or adjusted under 35 U.S.C. 154(b) by 470 days.

(21) Appl. No.: 11/176,452

(22) Filed: Jul. 7, 2005

(65) Prior Publication Data
US 2006/0039790 A1  Feb. 23, 2006

(30) Foreign Application Priority Data
Jul. 9, 2004 (EP) .................................. 04016250

(51) Int. Cl.
*F03D 11/00* (2006.01)
(52) U.S. Cl. .................................. 416/219 R; 29/889.1
(58) Field of Classification Search ............. 416/219 R, 416/220 R; 29/889.1, 889.2, 889.21, 889.22
See application file for complete search history.

(56) References Cited

U.S. PATENT DOCUMENTS

| 4,455,730 | A | * | 6/1984 | Guenther ..................... 29/252 |
| 5,410,286 | A |   | 4/1995 | Herd et al. |
| 5,617,026 | A |   | 4/1997 | Yoshino et al. |
| 5,708,360 | A |   | 1/1998 | Yui et al. |
| 6,416,286 | B1 |   | 7/2002 | Roberts et al. |
| 6,571,471 | B2 | * | 6/2003 | Hohmann .................. 29/889.1 |
| 2006/0207309 | A1 |   | 9/2006 | Miosga et al. |

FOREIGN PATENT DOCUMENTS

| DE | 100 20 229 A1 | 10/2001 |
| EP | 0 013 772 A1 | 8/1980 |

* cited by examiner

*Primary Examiner*—Edward Look
*Assistant Examiner*—Aaron R Eastman

(57) ABSTRACT

A device (10) for the demounting of blades (12), which are pushed in with a blade root (20) on a wheel disk (14) of a blade wheel (16) of a turbine or of a compressor, is designed with a support (24) which is designed to be brought to bear against at least one component of the turbine, and is designed with an actuator (28) which is coupled to the support (24) and is designed for moving the blade root (20) mechanically out of the wheel disk (14).

16 Claims, 2 Drawing Sheets

DEVICE FOR THE DEMOUNTING OF BLADES OF A TURBINE OR OF A COMPRESSOR

CROSS REFERENCE TO RELATED APPLICATIONS

This application claims priority of European application No. 04016250.5 EP filed Jul. 9, 2004, which is incorporated by reference herein in their entirety.

FIELD OF INVENTION

The invention relates to the field of the maintenance, repair and renewal of blades of a turbine or of a compressor which are pushed in with a blade root on a wheel disk of a blade wheel of such a machine and are held there.

BACKGROUND OF INVENTION

Blades of the abovementioned type of modern turbines or compressors, for example compressor moving blades, are provided with coatings which have to be renewed after a certain period of operation. To renew the coating, the blades have to be demounted from the turbine or the compressor. The demounting of such compressor moving blades must take place manually on account of the many different activities to be performed and is comparatively time-consuming. During the time when a blade is being demounted, work cannot be carried out at other points on a rotor of the respective turbine or compressor, such as, for example, in the region of the combustion chhub.

It is therefore common practice for the rotor to be destacked in order to recoat its blades and for the blades of the turbine or compressor then either to be recoated in the bladed blade wheels or to be demounted from the wheel disks and newly coated individually.

U.S. Pat. No. 6,416,286 discloses two devices which assist the installation of the last blade of a moving blade ring. The blades are designed as shroud blades and are pushed individually into axial holding grooves of a rotor disk. Since the shrouds are of Z-shaped design, as seen in the radial direction, it is not possible for the last moving blade to be pushed axially into the otherwise fully equipped moving blade ring. The last turbine blade of the moving blade ring therefore has to be introduced radially (without a moving blade root) on account of the shroud. In order to make this possible, the approximately closed shroud ring is spread both in the axial direction and in the tangential direction, that is to say circumferential direction. For this purpose, U.S. Pat. No. 6,416,286 proposes spreading the gap of the open shroud ring by means of a first device comprising two threaded rods, clamps and screw nuts, thus leading to sufficient play in the circumferential direction. A second device, which acts with force upon the moving blade roots of the adjacent moving blades, with respect to the last moving blade, axially in the opposite direction, brings about a sufficient play in the axial direction in the shroud ring, so that the last moving blade of the moving blade ring can be inserted radially and its shroud closes the shroud ring. The last moving blade of the ring can subsequently be fastened to the rotor disk by a separately produced moving blade root being pushed in axially.

Moreover, DE 100 20 229 A1 shows a method and a device for demounting a turbine blade. The turbine blade is pushed in in an axial holding groove. Between the groove bottom of the holding groove and the moving blade root of the turbine blade, there is a mounting gap, into which a hooked slide can be pushed. The hooked slide is provided with projections or hooks which are shaped correspondingly to cooling air supply ports located on the blade root on the groove bottom side. After the hooked slide has been pushed into the gap and the projections lie opposite the cooling air supply ports, a supporting slide is additionally pushed in between the groove bottom and hooked slide, lifts the hooked slide and thus hooks the hooks together with the cooling air supply ports of the blade root. Subsequently, by the hooked slide being drawn out, the moving blade can be drawn out of the holding groove with the aid of hydraulics.

SUMMARY OF INVENTION

An object on which the invention is based is to organize the procedure for the above described work of the maintenance, repair and renewal of blades in turbines more cost-effectively overall.

This object is achieved, according to the invention, by means of a device for the demounting of blades initially mentioned, with a supporting means which is designed to be brought to bear against at least one component of the turbine, and with an actuator means which is coupled to the supporting means and is designed for moving the blade root mechanically out of the wheel disk, the supporting means, with at least one bearing, being adapted to be brought to bear against a step of the blade wheel.

With such a device according to the invention, it is possible for the blades of turbines or compressors to be demounted in a comparatively short time on the associated blade wheel, without the associated rotor having to be destacked for this purpose. Furthermore, according to the invention, dispensing with destacking also makes the operation of reassembling the rotor unnecessary, so that, overall, considerable work time can be saved and costs can be lowered. According to the invention, in addition to the marked saving in terms of work time, the inspection time is also reduced considerably overall. Furthermore, a device for destacking the rotor may be dispensed with.

In the device according to the invention, its supporting means, with at least one bearing, is adapted to be brought to bear against a step of the blade wheel. Such a device can have a compact configuration and be used for various types of turbines or compressors, because it can have comparatively simple setting-up elements which can be provided with simple adjustment possibilities for adaption to different types of blade wheels.

Such a compact device can easily be handled by maintenance personnel when said work is being carried out.

Alternatively or additionally, the device may be provided with supporting means which, with at least one bearing, is brought to bear against a parting plane of an at least two-part housing of the turbine or of the compressor. Such a device can be mounted after, for example, an upper part of the at least two-part housing has been lifted off and consequently the rotor of the associated turbine or compressor has become accessible. The device, then put in place on the parting plane, can be adapted for the removal and, if appropriate, for the holding of a plurality of blades of a blade wheel. Individual blades can be moved out of the blade wheel successively or, if appropriate, simultaneously.

A device is particularly advantageous in which the actuator means is designed with a tension element for engaging around the blade moving out of the wheel disk. Such a device is particularly easy to handle and is operationally reliable.

A hydraulic cylinder/piston arrangement, by means of which comparatively high tensile or compressive forces can be generated in a confined space, is particularly suitable as an actuator means for the device according to the invention.

Furthermore, the actuator means is advantageously designed with a bearing surface for moving a securing element, in particular a securing plate, arranged on the blade out of the wheel disk, together with the associated blade. So that said securing plate can be pushed out of the wheel disk, with the device according to the invention a tab of the securing plate can advantageously be bent up on one side at the same time by said device during the pressing-out operation, and, consequently, the action of the securing plate can be canceled. When the blades are being reinstalled, a new securing plate is then inserted.

Furthermore, the device according to the invention advantageously has provided on it a holding means which is adapted for supporting the blade moving and/or moved out of the wheel disk. By such a holding means, the blade is guided during its removal, and the weight of the blade, which may amount, for example, to 30 kg, is absorbed.

On the rotor of known turbines or compressors, sealing tips or sealing lips are often formed, which ought not to be damaged during the demounting of blades. For this purpose, in the device according to the invention, a covering means is advantageously provided, which is adapted for covering the sealing tips. For this purpose, the covering means is advantageously designed, in particular, in one part together with the holding means, which may take place, for example, with the aid of a guide surface which is laid over the sealing tips and supported on the rotor and onto which or into which the blade to be moved out of the wheel disk is then pushed.

Furthermore, on the device according to the invention, a monitoring means should be provided, which is adapted for limiting the force acting on the blade by the actuator means. Such a monitoring means may be, for example, a load cell and a corresponding control and/or indicator for the actuator means. The monitoring means, in particular, prevents the situation where the groove formed on the wheel disk and receiving the blade root could be damaged during demounting.

BRIEF DESCRIPTION OF THE DRAWINGS

An exemplary embodiment of a device according to the invention is explained in more detail below with reference to the accompanying diagrammatic drawings in which.

DETAILED DESCRIPTION OF INVENTION

Figure 1:
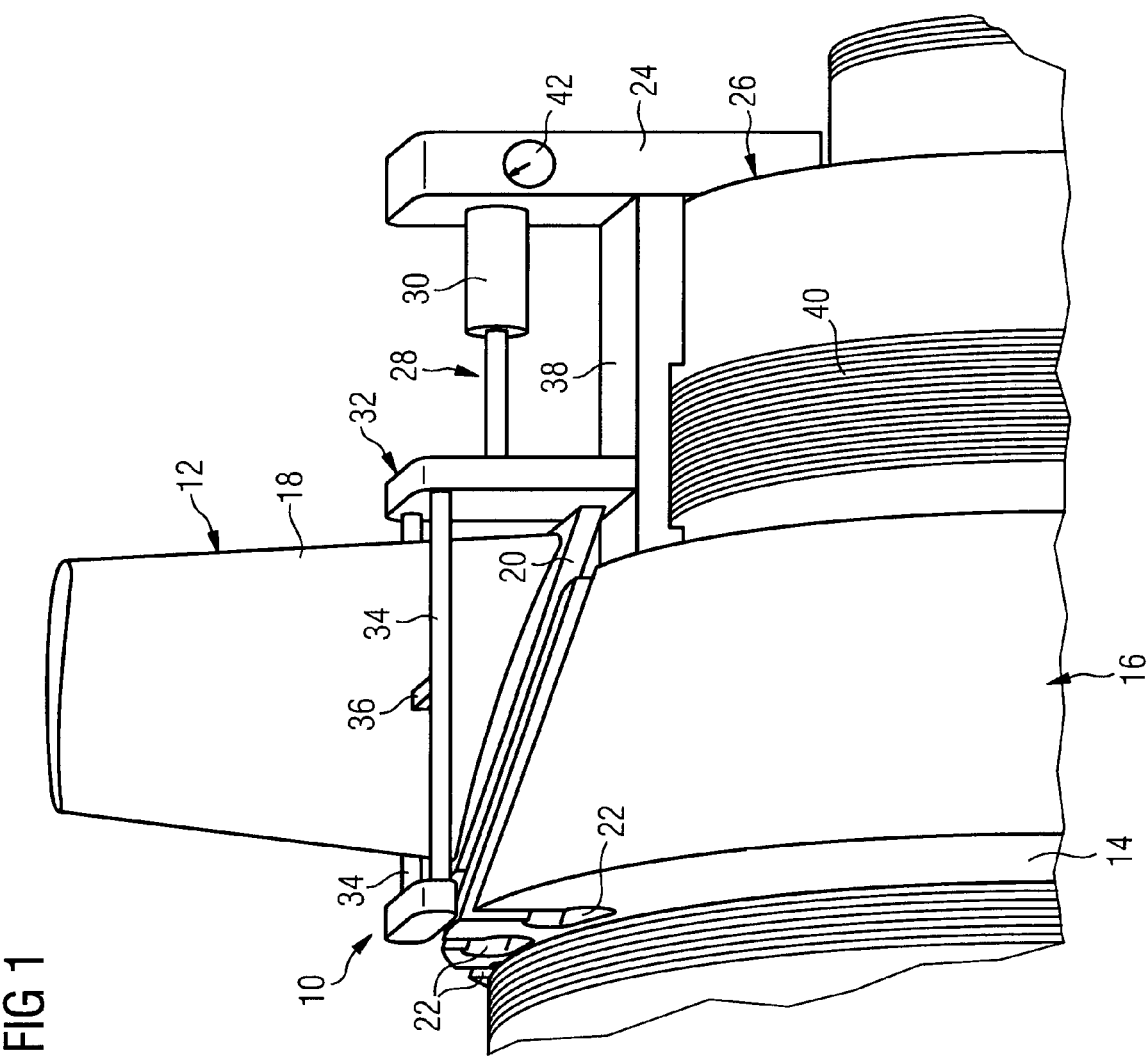
FIG. 1 shows a perspective side view of a device according to the invention during the demounting of a blade on a blade wheel.
Figure 2:
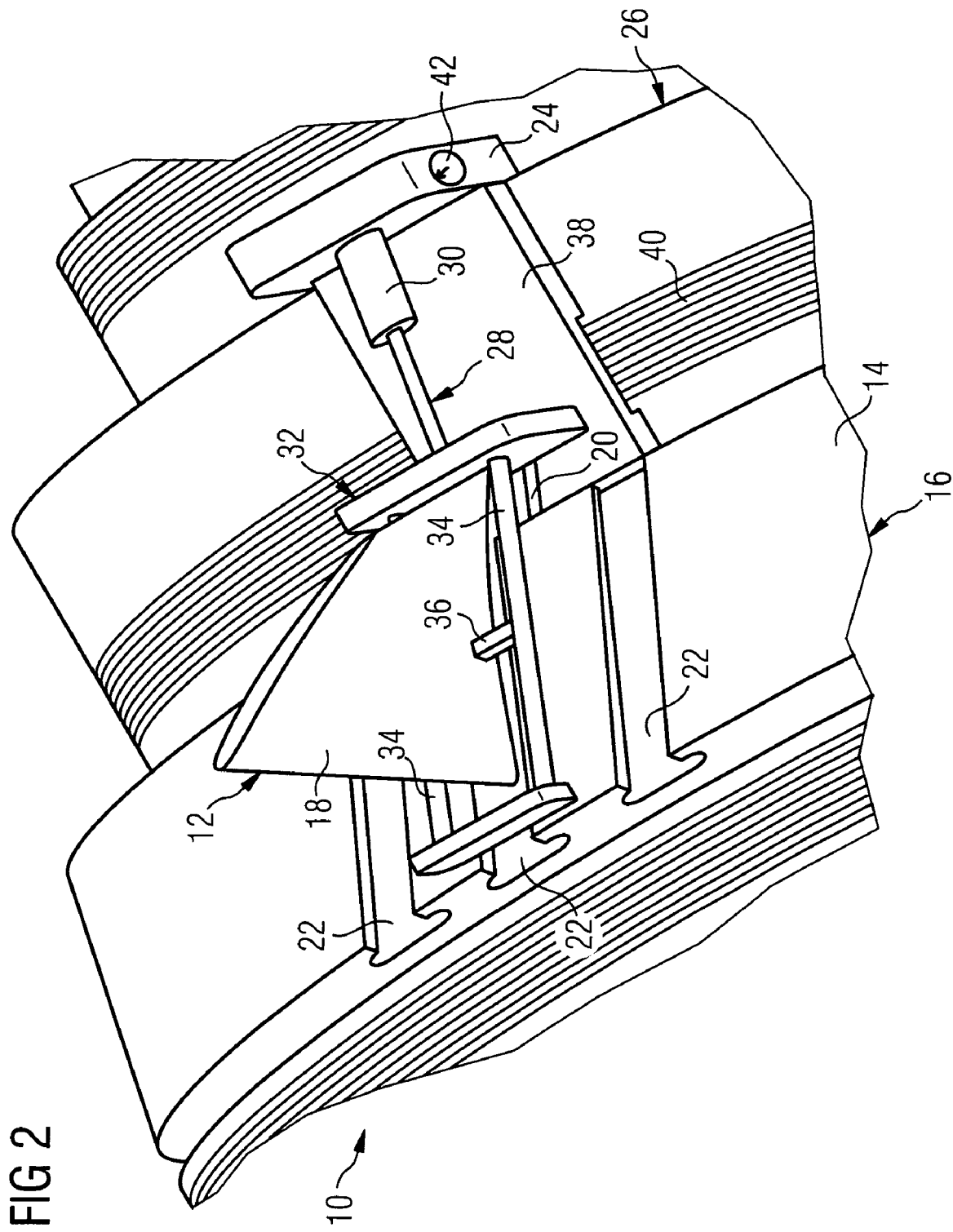
FIG. 2 shows a perspective top view of a device according to FIG. 1.

FIGS. 1 and 2 illustrate a device 10 for the demounting of blades 12 of a compressor which are attached to a wheel disk 14 of a blade wheel 16 or rotor of the compressor. The blades 12 each have a blade leaf 18 which is fastened in a groove 22 of the wheel disk 14 by means of a blade root 20. The blade root 20 is in this case pushed into the groove 22 in the axial direction of the blade wheel .16.

So that of the blades 12 can be removed cost-effectively, for example for recoating, even without a time-consuming destacking of the rotor, the device 10 is provided with a supporting means 24 which can be brought to bear against a step 26 of the blade wheel 16 and be supported there.

Coupled operatively to the supporting means 24 is an actuator means 28 which is provided for moving the blade 12 mechanically out of the wheel disk 14. The actuator means 28 comprises a cylinder/piston arrangement 30 which is arranged on the supporting means 24 and on the piston of which a tension element 32 is arranged. The tension element 32 engages around the blade 12 on its blade leaf 18 and is in this case designed with two tension bars 34, on which a holding bar 36 projects in each case. The holding bars 36 bear against the blade leaf 18 and support the latter in the circumferential direction of the blade wheel 16.

By the holding bars 36 and a holding surface 38, explained below, a holding means is formed, which supports the blade 12 during and after movement out of the wheel disk 14 and thus saves an operator from carrying out this labor-intensive and sometimes hazardous work.

Said holding surface 38 is provided under the cylinder/piston arrangement 30, as regards FIG. 1, and is supported there in front of the step 26 on the blade wheel 16. Furthermore, in this region of the blade wheel, the circumference of the latter has formed on it a multiplicity of sealing tips 40 which are covered by the holding surface 38. The holding surface 38 thus forms a covering means for protecting the sealing tips 40 during the demounting of a blade 12.

Finally, the device 10 also has provided on it, in the region of the supporting means 24, a monitoring means 42 in the form of a load/travel cell with indicator, which indicates to an operator the hydraulic force generated with the aid of the cylinder/piston arrangement 30 and, if appropriate, limits it to a maximum value. This force limitation prevents damage to the blade leaf 18, the blade root 20, the groove 22 and also the device 10 itself during the demounting of a blade 12.

The invention claimed is:

1. A device for the demounting of a blade which is pushed in with a blade root on a wheel disk of a blade wheel of a turbine engine, comprising:
    a support adapted to bear against a component of the turbine engine, the support having a bearing adapted to bear against a step of the blade wheel; and
    an actuator coupled to the support and for moving the blade root mechanically out of the wheel disk,
        wherein the actuator has a tension element for gripping the blade moving out of the wheel disk.

2. The device as claimed in claim 1, wherein the turbine engine is located in a turbine section or a compressor section.

3. The device as claimed in claim 1, wherein the actuator uses hydraulics.

4. The device as claimed in claim 1, wherein the actuator has a bearing surface for moving a securing element arranged on the blade out of the wheel disk with the associated blade.

5. The device as claimed in claim 1, further comprising a holding mechanism adapted for supporting the blade.

6. The device as claimed in claim 5, wherein the holding mechanism is adapted for guiding the blade during removal from the wheel disk.

7. The device as claimed in claim 1, further comprising a cover adapted for covering sealing tips formed on the blade wheel.

8. The device as claimed in claim 7, wherein the cover and a holding mechanism are formed as a single part.

9. The device as claimed in claim 1, further comprising a monitor adapted for limiting the force acting on the blade by the actuator.

10. The device as claimed in claim 9, wherein the monitor is selected from the group consisting of a load cell, a corresponding control, an indicator, and combinations thereof.

11. A turbine engine having a demountable blade within a turbine section of the turbine engine, comprising:
- a wheel disk of a blade wheel adapted for the blade to be pushed into the wheel disk via a blade root;
- a support adapted to bear against a component of the turbine, the support having a bearing adapted to bear against a step of the blade wheel; and
- an actuator coupled to the support and for moving the blade root mechanically out of the wheel disk,
- wherein the actuator has a tension element for gripping the blade moving out of the wheel disk.

12. The turbine engine as claimed in claim 11, wherein the actuator uses hydraulics.

13. The turbine as engine claimed in claim 11, wherein the actuator has a bearing surface for moving a securing element arranged on the blade out of the wheel disk with the associated blade.

14. The turbine engine as claimed in claim 11, further comprising a holding mechanism adapted for supporting the blade.

15. The turbine engine as claimed in claim 11, further comprising a cover adapted for covering sealing tips formed on the blade wheel.

16. The turbine engine as claimed in claim 11, further comprising a monitor adapted for limiting the force acting on the blade by the actuator.

* * * * *